(12) United States Patent
Girard et al.

(10) Patent No.: US 12,246,513 B2
(45) Date of Patent: Mar. 11, 2025

(54) BUILDING ENVELOPE

(71) Applicant: Walki Group Oy, Espoo (FI)

(72) Inventors: Pierrick Girard, Sainte Foy-lès-Lyon (FR); Ann-Mari Ukkonen, Valkeakoski (FI)

(73) Assignee: WALKI GROUP OY, Espoo (FI)

( * ) Notice: Subject to any disclaimer, the term of this patent is extended or adjusted under 35 U.S.C. 154(b) by 0 days.

(21) Appl. No.: 18/718,547

(22) PCT Filed: Jul. 1, 2022

(86) PCT No.: PCT/FI2022/050486
§ 371 (c)(1),
(2) Date: Jun. 11, 2024

(87) PCT Pub. No.: WO2023/111381
PCT Pub. Date: Jun. 22, 2023

(65) Prior Publication Data
US 2024/0416623 A1  Dec. 19, 2024

(30) Foreign Application Priority Data
Dec. 16, 2021  (EP) .................................. 21214963

(51) Int. Cl.
*B32B 15/14* (2006.01)
*B32B 5/02* (2006.01)
(Continued)

(52) U.S. Cl.
CPC ............... *B32B 15/14* (2013.01); *B32B 5/02* (2013.01); *B32B 7/12* (2013.01); *B32B 15/20* (2013.01);
(Continued)

(58) Field of Classification Search
CPC ..... B32B 15/14; B32B 15/20; B32B 2419/00; E04B 1/94; E04B 1/941; E04B 1/948
See application file for complete search history.

(56) References Cited

U.S. PATENT DOCUMENTS

| 2002/0095908 A1 | 7/2002 | Kiser |
| 2008/0261012 A1 | 10/2008 | Kopf et al. |

(Continued)

FOREIGN PATENT DOCUMENTS

| CN | 103275635 A | 9/2013 |
| CN | 106566429 A | 4/2017 |

(Continued)

OTHER PUBLICATIONS

International Search Report and Written Opinion for the corresponding International Application No. PCT/FI2022/050486, International Filing Date: Jul. 1, 2022, Date of Mailing: Oct. 18, 2022; 11 pages.
Office Action for Korean Patent Application No. 10-2024-7023802; Date of Mailing: Nov. 28, 2024, 4 pages.

(Continued)

*Primary Examiner* — Zachary M Davis
(74) *Attorney, Agent, or Firm* — CANTOR COLBURN LLP

(57) ABSTRACT

This invention relates to a building envelope (100) comprising a fire resistant tape (20) and a fire resistant barrier material (10), wherein the fire resistant tape (20) seals a seam between a first sheet (10a) of the fire resistant barrier material and a second sheet (10b) of the fire resistant barrier material, wherein the fire resistant barrier material (10) comprises a metallic layer (13), a support layer (15) and a glue layer (14) between the metallic layer (13) and the support layer (15), and the fire resistant tape comprises a metallic layer (23), a support layer (25), a glue layer (24) between the metallic layer (23) and the support layer (25), and an acrylic pressure sensitive adhesive coating layer (28)

(Continued)

on the support layer (25). This invention further relates to a fire resistant seam tape.

20 Claims, 3 Drawing Sheets

(51) Int. Cl.
 B32B 7/12 (2006.01)
 B32B 15/20 (2006.01)
 C09J 7/29 (2018.01)
 C09J 7/38 (2018.01)
 E04B 1/94 (2006.01)
(52) U.S. Cl.
 CPC ............... C09J 7/29 (2018.01); C09J 7/385 (2018.01); E04B 1/941 (2013.01); B32B 2255/02 (2013.01); B32B 2255/26 (2013.01); B32B 2262/101 (2013.01); B32B 2307/3065 (2013.01); B32B 2307/718 (2013.01); B32B 2307/7376 (2023.05); B32B 2419/00 (2013.01); C09J 2203/346 (2020.08); C09J 2301/302 (2020.08)

(56) References Cited

U.S. PATENT DOCUMENTS

| 2015/0285426 | A1 | 10/2015 | Shaw |
| 2021/0148112 | A1 | 5/2021 | Klein |
| 2022/0305765 | A1* | 9/2022 | Sandhar ................ B32B 25/042 |
| 2023/0278323 | A1* | 9/2023 | Bralia ..................... B32B 15/09 |
| | | | 428/337 |

FOREIGN PATENT DOCUMENTS

| CN | 111993719 A | 11/2020 |
| EP | 1061192 A | 3/2002 |
| JP | S49-81719 B2 | 8/1974 |
| JP | S56-10453 A | 2/1981 |
| JP | H09125560 A | 5/1997 |
| JP | 2012255261 A | 12/2012 |
| JP | 2013194073 A | 9/2013 |
| WO | 2011088184 A2 | 7/2011 |
| WO | 2021245294 A4 | 2/2022 |

OTHER PUBLICATIONS

Japanese Patent Office in the corresponding application No. 2024-536435 on Jan. 14, 2025.

* cited by examiner

BUILDING ENVELOPE

CROSS-REFERENCE TO RELATED APPLICATIONS

This application is a National Stage application of PCT/FI2022/050486, filed Jul. 1, 2022, which claims benefit of European Application No. 21214963.7 filed on Dec. 16, 2021, both of which are incorporated by reference herein in their entirety.

TECHNICAL FIELD

The specification relates to a fire resistant building envelope. The specification further relates to a fire resistant seam tape for a building.

BACKGROUND

Building envelopes can be used as a physical separator between conditioned and unconditioned environment of a building. Building envelopes can be used to protect indoors from liquid and vapor water, heat, light and noise transfer. Thanks to the building envelopes, it can be possible e.g. to keep warm or cold air indoors.

Buildings can have e.g. vapor barriers to prevent e.g. water, such as moisture, from getting into a wall assembly. However, there is still a need for improved building envelopes for buildings.

SUMMARY

It is an aim of this specification to provide a building envelope comprising a fire resistant barrier material and a fire resistant tape. Further, it is an aim of this specification to provide a fire resistant seam tape for a building.

Aspects of the invention are characterized by what is stated in the independent claims. Preferred embodiments are disclosed in the dependent claims. These and other embodiments are disclosed in the description and figures.

Buildings can comprise easily flammable materials. To strengthen reaction to fire, the novel building envelope discloses a fire resistant barrier material and a fire resistant seam tape for improved fire resistance, at least to some extent.

Furthermore, controllability of some barrier properties of the building envelope may be improved due to the combination comprising the fire resistant barrier material and the fire resistant tape, wherein the tape can have similar barrier properties as the fire resistant barrier material. The novel building envelope may provide, for example, better reaction to fire for improved safety of people in a building.

The fire resistant barrier material can be a fire resistant sheet material. The fire resistant barrier material can be a laminated sheet for a building. The fire resistant barrier material is preferably a fire resistant watertight water vapor barrier material which may be at least substantially airtight.

The fire resistant tape can be a fire resistant seam tape for a building. The fire resistant seam tape can be arranged to seal a seam between sheets of the fire resistant barrier material.

The building envelope can comprise the fire resistant tape and at least two sheets of the fire resistant barrier material, i.e., a first sheet and a second sheet, wherein the fire resistant tape seals a seam between said sheets. The first sheet may overlap the second sheet, and the tape can seal the seam between the overlapped sheets.

The building envelope comprising the fire resistant barrier material and the fire resistant tape can be installed for purpose of fire resistance, waterproofing, wind-breaking and/or water vapor barrier.

The fire resistant barrier material can comprise:
A) a metallic layer which can be an aluminum layer having a thickness in a range between 6 μm and 100 μm,
B) a support layer comprising
a glass fiber fabric having a specific mass in a range between 50 g/m$^2$ and 500 g/m$^2$, or
a glass fiber scrim having a specific mass in a range between 5 g/m$^2$ and 50 g/m$^2$, and
C) a glue layer between the metallic layer and the support layer, the glue layer having a specific mass in a range between 0.5 g/m$^2$ and 15 g/m$^2$.

Thanks to the above-mentioned structure of the fire resistant barrier material, flame retardant properties as well as some barrier properties, such as water vapor barrier, may be improved.

The glue layer of the barrier material may comprise a bicomponent or multicomponent glue. The glue layer of the barrier material can comprise a flame retardant glue. Preferably, the glue layer of the barrier material is a flame retardant bicomponent or multicomponent glue.

The fire resistant tape can comprise:
A) a metallic layer of the tape, which can be an aluminum layer having a thickness in a range between 6 μm and 100 μm,
B) a support layer of the tape comprising
a glass fiber fabric having a specific mass in a range between 50 g/m$^2$ and 500 g/m$^2$, or
a glass fiber scrim having a specific mass in a range between 5 g/m$^2$ and 50 g/m$^2$,
C) a glue layer of the tape between the metallic layer and the support layer, the glue layer having a specific mass in a range between 0.5 g/m$^2$ and 15 g/m$^2$, and
D) an acrylic pressure sensitive adhesive coating layer on the support layer of the tape, the acrylic pressure sensitive adhesive coating layer having a specific mass in a range between 20 g/m$^2$ and 200 g/m$^2$.

Thus, the flame retardant properties as well as some barrier properties of the fire resistant tape may be improved. Furthermore, the acrylic pressure sensitive adhesive can provide an improved seal for the fire resistant sheets.

The glue layer of the fire resistant tape can comprise a bicomponent or multicomponent glue. The glue layer of the fire resistant tape can comprise a flame retardant glue. Preferably, the glue layer of the tape is a flame retardant bicomponent or multicomponent glue.

The pressure sensitive adhesive coating layer may be a flame retardant acrylic pressure sensitive adhesive coating layer. Preferably, the specific mass of the acrylic pressure sensitive adhesive coating layer is in a range between 30 g/m$^2$ and 80 g/m$^2$.

The specific mass of the glue layers of the fire resistant tape and the fire resistant barrier material can be in a range between 0.7 g/m$^2$ and 3 g/m$^2$. Further, the specific mass of the glass fiber fabrics of the fire resistant tape and the fire resistant barrier material, if used, may preferably be in a range between 70 g/m$^2$ and 90 g/m$^2$. Furthermore, the thickness of the metallic layers of the fire resistant tape and the fire resistant barrier material may preferably be in a range between 30 μm and 50 μm.

Thanks to the novel solution, it is possible to obtain a building envelope having improved fire resistivity and good strength properties. Furthermore, vapor barrier properties of the building envelope can be improved.

The fire resistant tape can fulfil the European fire protection standard Euroclass B—s2, d0. Further, the fire resistant barrier material can fulfil the European fire protection standard Euroclass A2—s1, d0.

Surprisingly, the building envelope comprising both, the fire resistant barrier material sheets according to Euroclass A2—s1, d0, and the fire resistant seam tape according to Euroclass B—s2, d0, may be able fulfil the European fire protection standard Euroclass A2—s1, d0, as long as the amount of the fire resistant seam tape is equal to or less than 15%, determined from a total outer surface area of the building envelope.

The fire resistant tape can have several technical effects. The acrylic adhesive layer can improve adhesion between the fire resistant tape and the fire resistant barrier material. Thus, the acrylic adhesive can improve water vapor sealing properties of the tape. Further, the fire resistant tape can have good mechanical properties. Still further, the fire resistant tape can have a suitable hydrophobicity, hence, the building envelope comprising the fire resistant tape and the fire resistant barrier material can have low water absorption values. This can substantially improve usability of the building envelope comprising the fire resistant barrier material and the fire resistant tape.

The building envelope comprising the fire resistant barrier material together with the fire resistant tape can be arranged to protect a building, at least to some extent, from fire. This can give some additional time for an individual to escape from the building.

The fire resistant barrier material together with the fire resistant tape can further be arranged to protect the building from humidity and/or diffusion of air. Further, the fire resistant barrier material together with the fire resistant tape can be arranged to protect the building from water vapor. Some barrier properties of the building envelope comprising the fire resistant barrier material together with the fire resistant tape can be easier to control than conventionally due to the fire resistant tape, which tape can have similar same barrier properties as the fire resistant barrier material, or even better barrier properties than the fire resistant barrier material.

The fire resistant barrier material is preferably a water vapor barrier sheet. The novel building envelope can be used as a vapor barrier for high rise building and public building where fire safety is crucial.

The fire resistant barrier material may not have e.g. microperforation or any other kinds of holes in order to obtain good barrier properties. Further, the fire resistant barrier material may not be so called breathable material.

The building envelope can be environmentally friendly solution. For example VOC (volatile organic compound) emissions of the building envelope can be low.

IAC Gold-certification can be given to products fulfilling low product emissions-requirements. The building envelope comprising the fire resistant barrier material and the fire resistant tape according to this specification can have low emissions according to Eurofins Indoor Air Comfort GOLD (IAC Gold) VOC requirements.

BRIEF DESCRIPTION OF THE DRAWINGS

In the following, the invention will be described in more detail with reference to the appended drawings, in which.

Figure 1A:
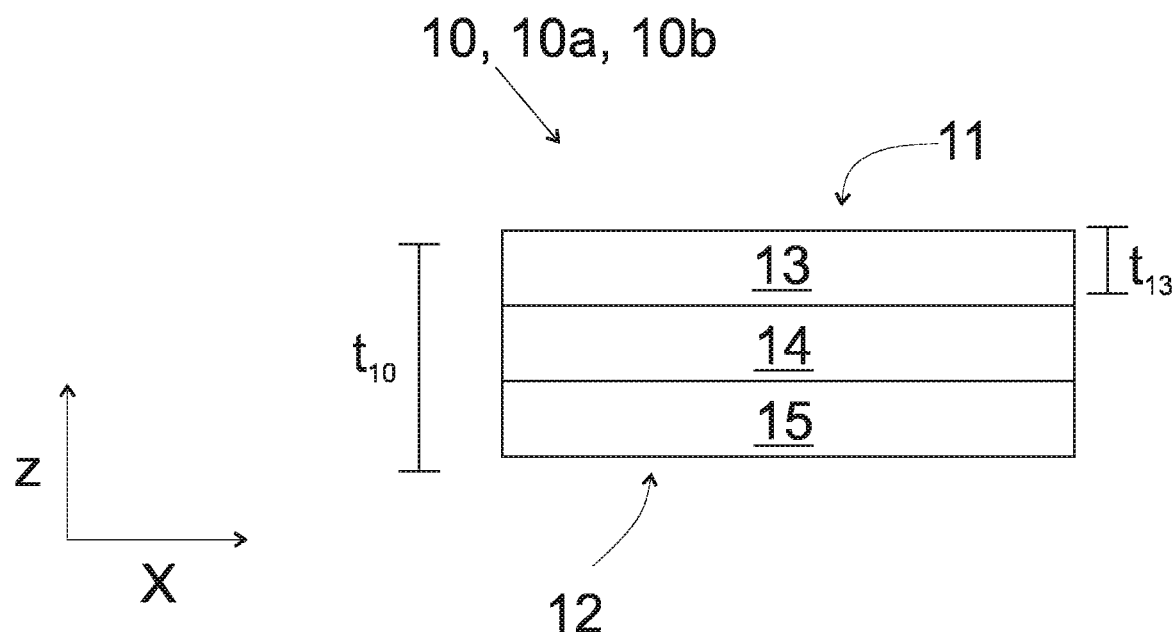
FIGS. 1a-b illustrate example layers of a fire resistant barrier material.

The figures are schematic and are intended to illustrate the general principles of the disclosed solution. Therefore, the illustrations in the Figures are not necessarily in scale or suggestive of precise layout of system components.

DETAILED DESCRIPTION

The solution is described in the following in more detail with reference to some embodiments, which shall not be regarded as limiting.

In this specification, references are made to Figures, in which the following reference numerals and denotations are used:

10 fire resistant barrier material,
10a first sheet of the fire resistant barrier material,
10b second sheet of the fire resistant barrier material,
t10 thickness of the fire resistant barrier material,
11 first surface of the fire resistant barrier material,
12 second surface of the fire resistant barrier material,
13 metallic layer of the fire resistant barrier material,
t13 thickness of the metallic layer of the fire resistant barrier material,
14 glue layer of the fire resistant barrier material,
15 support layer of the fire resistant barrier material,
16 lacquer layer of the fire resistant barrier material,
17 printing of the fire resistant barrier material,
20 fire resistant tape,
20a sealed seam formed by the fire resistant tape,
t20 thickness of the fire resistant tape,
21 first surface of the fire resistant tape,
22 second surface of the fire resistant tape,
23 metallic layer of the fire resistant tape,
t23 thickness of the metallic layer of the fire resistant tape,
24 glue layer of the fire resistant tape,
25 support layer of the fire resistant tape,
26 lacquer layer of the fire resistant tape,
27 printing of the fire resistant tape,
28 adhesive coating of the fire resistant tape, and
100 building envelope comprising the fire resistant barrier material and the fire resistant tape.

In this specification, term "comprising" may be used as an open term, but it also comprises the closed term "consisting of".

Throughout this description, percentage values relating to an amount of a material are percentages by weight (wt. %) unless otherwise indicated. All percentage values refer to dry weight unless otherwise indicated.

Throughout this description, the term "specific mass" refers to the mass of a material layer as divided by the area of the layer (g/m$^2$), i.e. a grammage.

The term "gsm" refers to grams per square meter (g/m$^2$).

In this application, the term "MD" refers to machine direction. The term "machine direction" is known by a person skilled in the art. The term "machine direction" refers to manufacturing direction of a web, which is longitudinal direction of a web. In rolls, the machine direction is circumferential direction of a roll.

In this application, the term "CD" refers to cross direction. The term "cross direction" is known by a person skilled in the art. The cross direction refers to a direction that is transversal to the machine direction.

The reaction to fire is determined and classified according to European fire protection standard EN 13501-1:2007+A1: 2009 (valid in 2021).

Grammage can be measured according to standard EN 1849-2 (valid in 2021). Further, thickness can be determined according to the standard EN 1849-2.

Fire Resistant Barrier Material

Figure 1B:
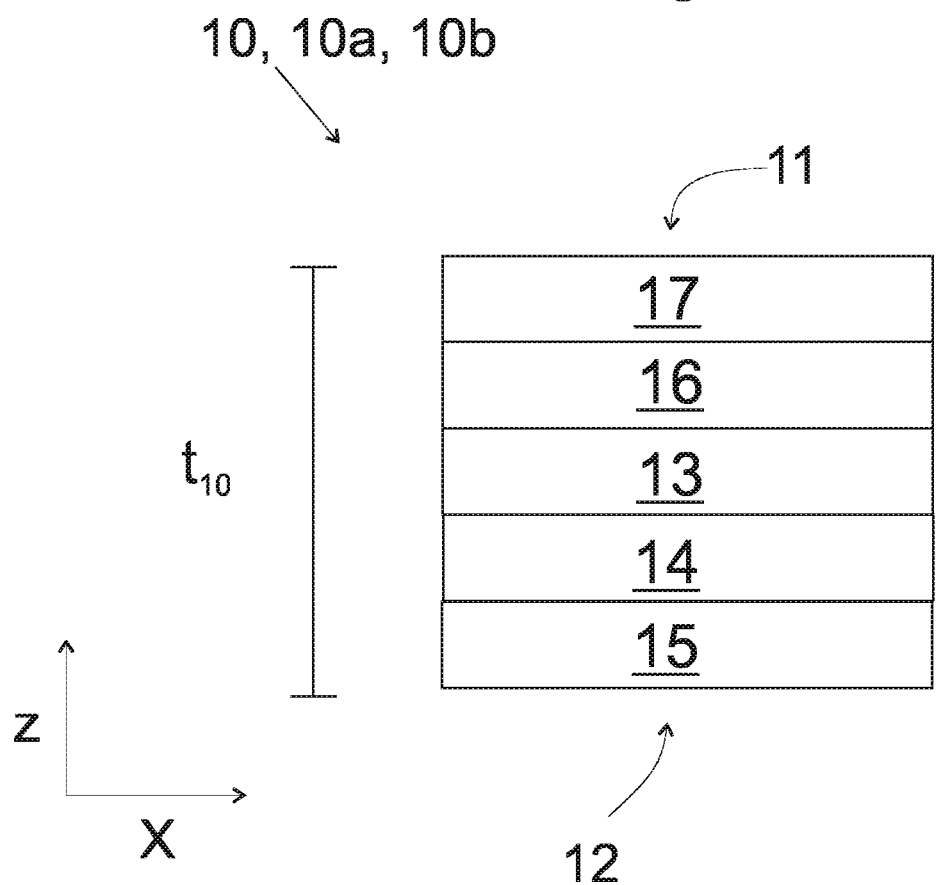

Referring to FIGS. 1a-b, the fire resistant barrier material 10 can comprise a first surface 11 and a second surface 12. The fire resistant barrier material 10 can be a fire resistant barrier material sheet 10a, 10b.

The fire resistant barrier material comprises a metallic layer 13, a support layer 15, and a glue layer 14 between the metallic layer and the support layer, which glue layer 14 is preferably a flame retardant glue layer.

In an embodiment, the fire resistant barrier material 10 consists of
- a metallic layer 13,
- a support layer 15, which may be a fire resistant support layer comprising a fiber glass fabric,
- a glue layer 14 between the metallic layer and the support layer, which is preferably a flame retardant glue layer,
- optionally, a lacquer layer 16 on the metallic layer, and
- optionally, a printing 17 on the lacquer layer.

The glue layer 14 can be left in between the metallic layer 13 and the support layer 15 in order to attach the metallic layer to the support layer.

The fire resistant support layer 15 can efficiently support the metallic layer 13 from external stress while improving fire resistivity of the fire resistant barrier material. Further, the metallic layer can improve stiffness of the product while further improving fire resistivity of the fire resistant barrier material. Furthermore, by using the flame retardant glue, fire performance of the fire resistant barrier material 10 can be substantially improved.

In order to obtain some improved properties, total grammage of the fire resistant barrier material can be in a range between 100 gsm and 300 gsm, preferably in a range between 150 gsm and 190 gsm. Further, in an embodiment, a thickness of the fire resistant barrier material can be in a range between 100 μm and 300 μm, preferably in a range between 130 μm and 180 μm.

The fire resistant barrier material can be arranged to have an Sd (water vapour permeability) value of equal to or more than 1500 m, measured according to standard EN 1931 (valid in 2021).

The fire resistant barrier material can be arranged to have W1 water tightness, measured according to standard EN 1928:2000, method A, with pressure of 2 kPa as determined in EN13984:2013.

The fire resistant barrier material can be arranged to have a tensile force (measured in machine direction) of at least 700 N/50 mm, preferably of at least 750 N/50 mm, measured according to standard EN 12311-1, modified with EN13859-1:2020, Annex A as determined in EN13984:2013.

The fire resistant barrier material can be arranged to have a tensile force (measured in cross direction) of at least 700 N/50 mm, preferably of at least 750 N/50 mm, measured according to standard EN 12311-1, modified with EN13859-1:2020, Annex A as determined in EN13984:2013.

The fire resistant barrier material can be arranged to have an elongation at maximum force in MD and in CD of at least 2.5%, and preferably less than 6%, measured according to standard EN 12311-1, modified with EN13859-1:2020, Annex A as determined in EN13984:2013.

The Metallic Layer of the Fire Resistant Barrier Material

The fire resistant barrier material 10, 10a, 10b comprises the metallic layer 13. The metallic layer 13 can be an aluminum layer. Thus, the metallic layer 13 is preferably made of aluminum. Aluminum is beneficial for its low gas diffusivity, fire resistivity, and light weight. Thus, aluminum may not increase weight of the fire resistant barrier material too much while improving e.g. fire resistance of the fire resistant barrier material.

The metallic layer 13 of the fire resistant barrier material 10 can be an aluminum layer having a thickness in a range between 6 μm and 100 μm, preferably in a range between 30 μm and 50 μm. The thickness of the metallic layer may be at least 6 μm, preferably at least 15 μm, more preferably at least 25 μm, and most preferably at least 30 μm μm in order to provide good water vapor barrier as well as improve fire resistance and stiffness properties of the fire resistant barrier material. Further, the thickness of the metallic layer may be equal to or less than 100 μm, preferably equal to or less than 80 μm, more preferably equal to or less than 60 μm, and most preferably equal to or less than 50 μm in order to decrease costs. Further, installation process can be easier if weight of the product is small enough.

The metallic layer can be made of one or more than one aluminum layer. The metallic layer may comprise only one aluminum layer. In an embodiment, the metallic layer 13 is made of two or three aluminum layers each having a thickness in a range between 6 μm and 50 μm, preferably in a range between 20 μm and 40 μm, so that the total thickness of the metallic layer is in a range between 20 μm and 100 μm, preferably in a range between 50 μm and 90 μm. In the embodiments in which the metallic layer comprises at least two aluminum layers, there may be an attachment layer left in between two adjacent aluminum layers in order to form the metallic layer. The attachment layer may comprise or consist of one or more than one polymer. The attachment layer may comprise an ionomer. The attachment layer may comprise a plastic layer, such as a layer made of a polyamide. In an embodiment, the attachment layer comprises, for example, a glue. The attachment layer may be a flame retardant attachment layer.

Support Layer of the Fire Resistant Barrier Material

The fire resistant barrier material 10 comprises the support layer 15, which can be a fire resistant support layer. The fire resistant support layer 15 can substantially improve fire resistance of the fire resistant barrier material. The fire resistant support layer 15 can further improve internal strength of the fire resistant barrier material and e.g. support the metallic layer from external stress.

The support layer may comprise at least 80 wt. % glass fibers. Preferably, the support layer comprises at least 90 wt. % glass fibers, more preferably at least 95 wt. % glass fibers, and most preferably at least 97 wt. % glass fibers, determined from a total weight of the support layer. The fire resistant support layer can comprise or consist of a glass fiber fabric. The benefits obtained from the glass fiber fabric can be realized the better, the less the support layer comprises other materials.

Glass fibers of the glass fiber fabric may be sized glass fibers. Thus, the glass fiber fabric is preferably a sized glass fiber fabric made by weaving sized glass fiber yarns. The sizing can allow fibers to go through the weaving process without breaks.

Advantageously, the glass fibers are sized before the weaving process by using polyvinyl alcohol. An amount of the polyvinyl alcohol may be in a range between 0.1-1 g/m$^2$, determined from total weight of the glass fiber fabric. The sizing can improve easiness of weaving of the fabric.

The support layer may be made of glass fibers. Glass fibers of the glass fiber fabric of the fire resistant barrier material can be incombustible textile fibers; hence, the glass fiber fabric can substantially improve flame resistance of the fire resistant barrier material.

Furthermore, the glass fibers can be strong fibers and, hence, the glass fiber fabric can provide good strength properties for the fire resistant barrier material. Still further, thanks to the glass fiber fabric, dimensional stability of the product can be improved. The improved dimensional stability can further protect other layers, e.g. the metallic layer. Still further, the good dimensional stability can improve easiness of installation process, in which at least some seams between fire resistant barrier material sheets can be sealed by using the fire resistant tape. Furthermore, thermal conductivity of the glass fiber fabric can be low, which can be useful in a building.

The glass fiber fabric is preferably so called raw glass fiber fabric, i.e., unfinished glass fiber fabric. Thanks to the raw glass fiber fabric, it is possible to obtain improved strength properties for the fire resistant barrier material. Glass fiber yarns of the raw glass fiber fabric may have been sized before the weaving process.

The glass fiber fabric, particularly raw glass fiber fabric, may form a fire resistant layer which can substantially improve flame retardant properties of the fire resistant barrier material. Thus, the fire resistant support layer can substantially improve flame retardant properties of the building envelope comprising the fire resistant tape and the fire resistant barrier material.

The glass fiber fabric can be incombustible, or at least substantially incombustible, i.e., it may not support flame. Furthermore, it may not emit toxic substances or smoke even upon exposure to heat, which can be particularly useful property in buildings. Still further, the glass fiber fabric may not be easily affected by rodents or insects.

The glass fiber fabric can be in a form of a layer having a predetermined specific mass. The fire resistant support layer of the fire resistant barrier material can have specific mass in a range between 50 $g/m^2$ and 500 $g/m^2$, preferably in a range between 60 $g/m^2$ and 300 $g/m^2$, more preferably in a range between 65 $g/m^2$ and 150 $g/m^2$, and most preferably in a range between 70 $g/m^2$ and 90 $g/m^2$. Thus, the fire resistant support layer may be able to improve fire resistance while supporting the metallic layer, without being too heavy for the fire resistant barrier material. Further, the smaller the specific mass is, the smaller may be the production costs. The aforementioned specific mass of the fire resistant support layer can provide good mechanical support and resistivity to fire without too much weight increase.

In an embodiment, the support layer can comprise or consist of glass fiber yarns having a decitex value in a range between 17-136 dtex, such as in a range between 30 and 100 dtex. A person skilled in the art knows the term "decitex (dtex)". The above mentioned decitex values refer to such yarn fineness which can be beneficial for obtaining at least some of the above mentioned benefits cost efficiently.

In an embodiment, the support layer 15 of the fire resistant barrier material comprises or consists of a glass fiber scrim having a specific mass in a range between 5 $g/m^2$ and 50 $g/m^2$, preferably in a range between 10 $g/m^2$ and 40 $g/m^2$. The glass fiber scrim can be a cost efficient alternative for the support layer. However, the glass fiber fabric can provide some better properties than the glass fiber scrim.

Glue Layer of the Fire Resistant Barrier Material

The fire resistant barrier material further comprises a glue layer 14 between the metallic layer 13 and the support layer 15 to attach the metallic layer 13 to the support layer 15.

The glue layer of the barrier material may comprise a bicomponent or multicomponent glue. The glue layer can be a flame retardant glue layer. Preferably, the glue layer of the barrier material is a flame retardant bicomponent or multicomponent glue.

The glue layer can have a specific mass in a range between 0.1 $g/m^2$ and 15 $g/m^2$, preferably in a range between 0.5 $g/m^2$ and 3 $g/m^2$. The glue layer of the barrier material layer may have a specific mass of at least 0.1 $g/m^2$, preferably equal to or more than 0.3 $g/m^2$, more preferably equal to or more than 0.5 $g/m^2$, and most preferably equal to or more than 0.8 $g/m^2$. Thus, the glue layer can provide good adhesion for layers to be attached to each other. Further, the glue layer may have a specific mass of equal to or less than 15 $g/m^2$, preferably equal to or less than 10 $g/m^2$, more preferably equal to or less than 6 $g/m^2$, and most preferably equal to or less than 3 $g/m^2$. Thus, the glue layer can be manufactured cost efficiently.

As discussed, the glue layer 14 is preferably the flame retardant glue layer, most preferably the flame retardant bicomponent or multicomponent glue layer.

The glue layer can comprise, or be made of, a flame retardant water based bicomponent or multicomponent glue. Preferably, the glue layer comprises bicomponent or multicomponent polyurethane glue.

The bicomponent or multicomponent glue can be obtained by mixing at least two components, e.g., polyol and isocyanate, in order to obtain the bicomponent or multicomponent glue. Preferably, the glue layer comprises bicomponent or multicomponent polyurethane glue formed by a reaction of isocyanates with polyols. Thanks to the bicomponent or multicomponent glue, tough and flexible bonds can be formed between the glass fiber fabric and the metallic layer. Furthermore, the bicomponent or multicomponent polyurethane glue can be particularly strong glue which can be resistant to degradation. Furthermore, the bicomponent or multicomponent polyurethane glue can work well with both surfaces: the glass fiber fabric and the metallic layer. Moreover, thanks to the isocyanate component, the adhesive properties of the glue can be improved.

The glue layer 14 of the fire resistant barrier material can comprise one or more than one flame retardant component. In an embodiment, the flame retardant component(s) of the glue layer comprise or consist of at least one of:

nitrogen based component(s), particularly melamine, such as melamine polyphosphate, or melamine cyanurate, phosphor based component(s), particularly ammonium polyphosphate (APP), and inorganic based component(s), particularly alumina trihydrate (ATH) and/or magnesium hydroxide (MDH).

These chemicals can provide strongly improved fire resistance and flame extinguish properties for the glue layer.

Technical effect of the nitrogen based component(s) is releasing inert nitrogen N2 for diluting fire gases, acting as cooling agents by endothermic decomposition, and also working as blowing agents in intumescent systems.

Technical effect of phosphor based component(s) is that, due to the carbon-rich environment, the gas-phase mechanism by forming phosphorus radicals is favored. Further, another flame retardant mechanism of ammonium polyphosphate is a formation of a char layer, which is a thick layer of carbon.

Technical effect of inorganic based component(s) is that they can reduce the burning rate, e.g., by releasing water to decrease the temperature (endothermic reaction) since decomposition occurs at higher temperatures. Further, minerals, such as aluminum, can also contribute to glassy char formation.

Thanks to the glue layer 14, many advantages can be obtained. For example, adhesion between the support layer and the metallic layer can be improved. Further, some barrier properties of the fire resistant barrier material can be improved. Furthermore, fire resistivity can be improved.

Lacquer Layer of the Fire Resistant Barrier Material

The fire resistant barrier material may further comprise a lacquer layer 16, such as transparent or black lacquer layer, on the metallic layer 13.

The lacquer layer can improve visual appearance of the fire resistant barrier material 10. The lacquer layer can further protect the metallic layer 13. Particularly, the lacquer layer 16, if used, can prevent a surface of e.g. aluminum layer being easily oxidized. Thus, preferably, the lacquer layer, if used, is applied directly on the aluminum layer. Further, the lacquer can be used as a printing enhancer.

In an embodiment, the lacquer layer 16 is the transparent lacquer layer. The transparent lacquer layer on the metallic layer can provide a low emissivity enhancing solution, contributing to improve insulation by IR radiation and hence reducing the heat transfer.

The lacquer layer may have a specific mass, e.g., in a range between 0.5 $g/m^2$ and 2 $g/m^2$.

Printing of the Fire Resistant Barrier Material

The fire resistant barrier material may further comprise a printing 17 on the lacquer layer 16. The fire resistant barrier material 10 may be printed or unprinted. Therefore, the printing 17 is not necessarily needed for the fire resistant barrier material, but it is merely an optional layer of the fire resistant barrier material e.g. for providing information.

The outer surface of the fire resistant barrier material may comprise e.g. printing and/or lacquer. Thus, the metallic layer 13 may be at least partly covered by the lacquer layer 16 and/or printing 17.

Fire Resistant Tape

Figure 2A:
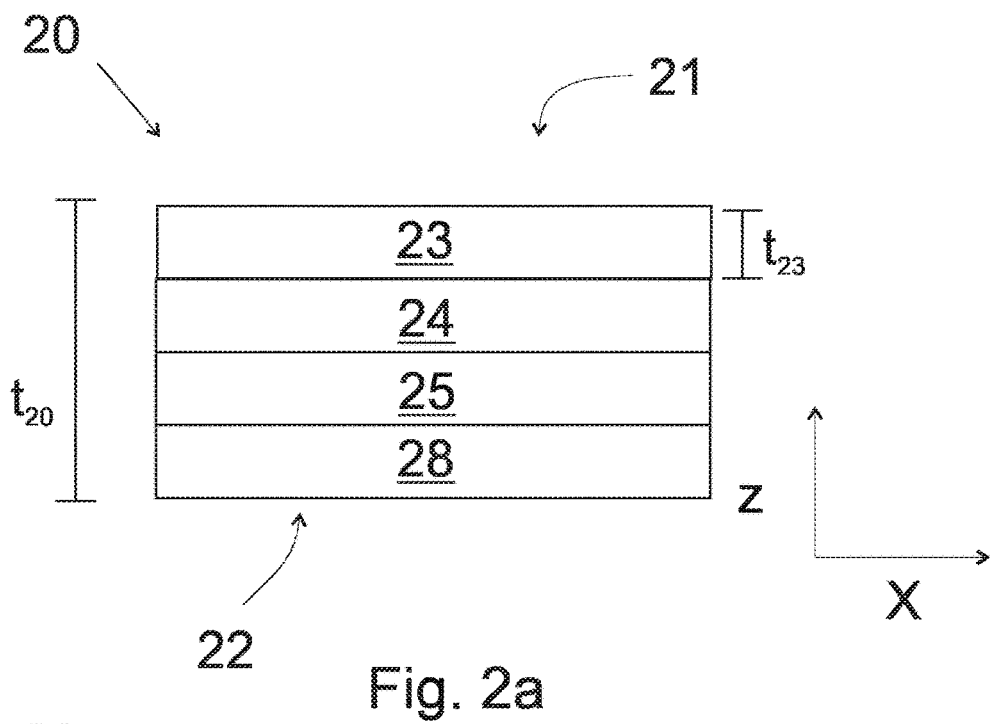
FIGS. 2a-b illustrate example layers of a fire resistant tape.
Figure 2B:
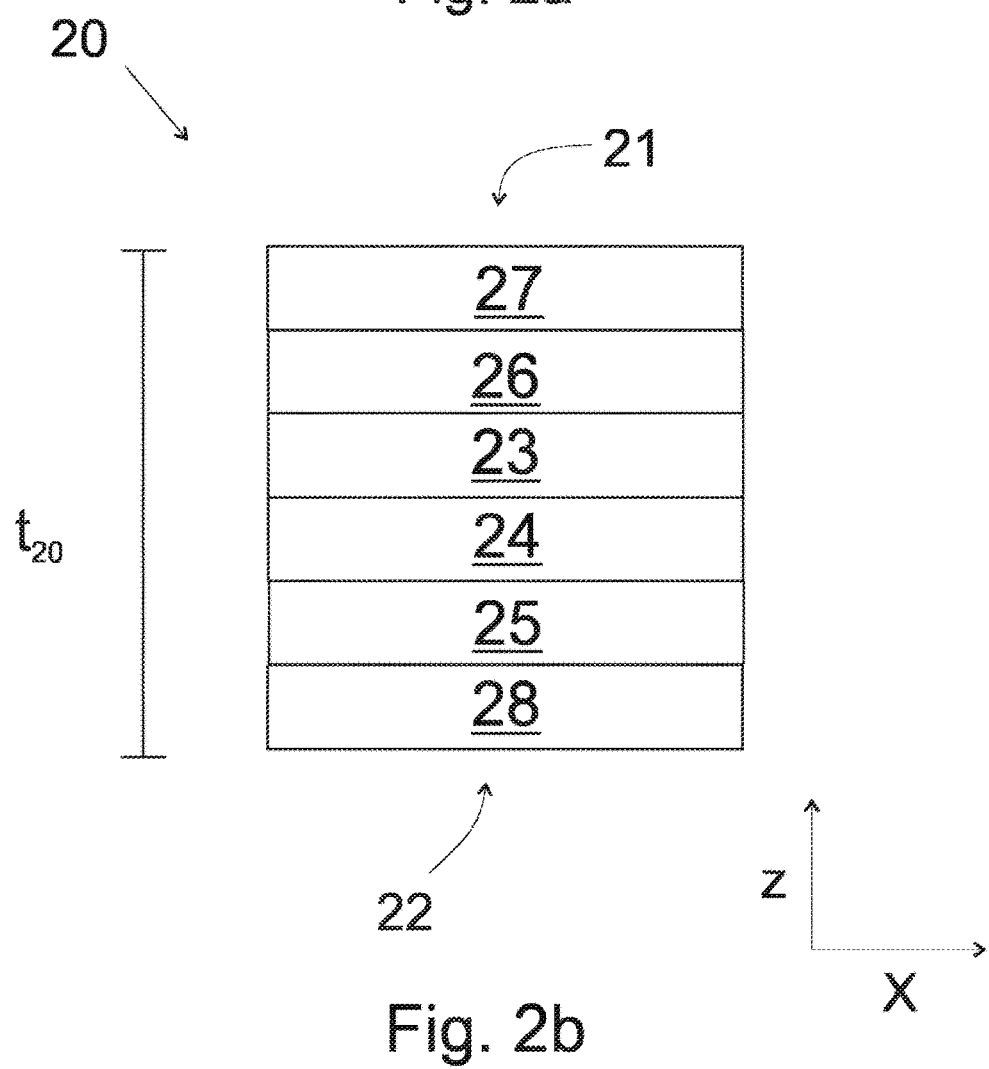

Referring to FIGS. 2a-b, the fire resistant tape can comprise
- a metallic layer 23 of the fire resistant tape,
- a support layer 25 of the fire resistant tape, which may be a fire resistant support layer comprising e.g. fiber glass fabric,
- a glue layer 24 of the fire resistant tape, which glue layer is in between the metallic layer 23 and the fire resistant support layer 25, the glue layer preferably being a flame retardant glue layer, and
- an acrylic pressure sensitive adhesive coating layer 28 on the support layer 25.

The fire resistant tape may be in a form of a web. The term "web" refers to a continuous material. Webs, such as tapes, may be stored and/or transported as rolls.

The fire resistant tape 20 can comprise the first surface 21 and the second surface 22 of the fire resistant tape. The second surface 22 can be an inner surface of the fire resistant tape 20, to be attached to the fire resistant barrier material. The first surface 21 of the fire resistant tape 20 can be an outer surface of the fire resistant tape 20.

Thus, the second surface 22 of the tape 20 can be attachable to the fire resistant barrier material 10. Preferably, the second surface 22 of the tape 20 is arranged to be attached to the first surface 11 of the fire resistant barrier material.

In an embodiment, the fire resistant tape consists of
- metallic layer 23,
- support layer 25, which is preferably a layer of a fiber glass fabric,
- glue layer 24 between the metallic layer 23 and the support layer 25, which glue layer is preferably a flame retardant glue layer,
- pressure sensitive adhesive coating layer 28 on the support layer,
- optionally, a lacquer layer 26 on the metallic layer,
- optionally, a printing 27 on the lacquer layer, and
- optionally, a release liner on the adhesive layer.

In an embodiment, the glue layer 24 of the fire resistant tape is a flame retardant glue layer, which is left in between the metallic layer 23 and the support layer 25. Furthermore, the support layer 25 is preferably left in between the glue layer 24 and the pressure sensitive adhesive coating layer 28. In this embodiment, the support layer 25 can efficiently support the metallic layer 23 from external stress while improving fire resistivity of the fire resistant tape. Further, thanks to the flame retardant glue layer, fire performance of the fire resistant tape 20 can be substantially improved. Further, the acrylic pressure sensitive adhesive coating layer 28 is preferably a flame retardant acrylic pressure sensitive adhesive coating layer. Thanks to the flame retardant acrylic pressure sensitive adhesive coating layer, it is possible to form a suitable seal for fire resistant barrier material sheets in order to improve flame retardant properties as well as some barrier properties of the building envelope.

In order to provide the predetermined flame resistant and barrier properties for the building envelope, a width of the fire resistant tape may be, for example, in a range between 60 mm and 150 mm, preferably in a range between 65 mm and 110 mm, and most preferably in a range between 70 mm and 90 mm.

The fire resistant tape can be arranged to have an Sd value of equal to or more than 1500 m, measured according to standard EN 1931 (valid in 2021).

The fire resistant tape can be arranged to have W1 water tightness, measured according to standard EN 1928:2000, method A, with pressure of 2 kPa as determined in EN13984:2013.

The fire resistant tape material can be arranged to have a tensile force, measured in machine direction, of at least 700 N/50 mm, preferably of at least 750 N/50 mm, measured according to standard EN 12311-1, modified with EN13859-1:2020, Annex A as determined in EN13984:2013.

The fire resistant tape can be arranged to have a tensile force, measured in cross direction, of at least 400 N/50 mm, preferably of at least of at least 450 N/50 mm, measured according to standard EN 12311-1, modified with EN13859-1:2020, Annex A as determined in EN13984:2013.

The fire resistant tape can be arranged to have an elongation at maximum force in MD and in CD of at least 2.5% and preferably less than 6%, measured according to standard EN 12311-1, modified with EN13859-1:2020, Annex A as determined in EN13984:2013.

The fire resistant tape may be stored and/or transported so that the pressure sensitive adhesive coating layer 28 is protected by a release liner (not shown in Figures). In this embodiment, the release liner is arranged to be on the pressure sensitive adhesive coating layer 28 before the fire resistant tape is used to seal a seam. Thus, the release liner will be removed before using the fire resistant tape. The release liner may improve self-woundability of the fire resistant tape. Particularly, the release liner can help the fire resistant tape to be self-wound around itself, without tendency of blocking layers to each other. Without the release liner, adjacent layers of a roll might be attached to each other due to the adhesive layer of the fire resistant tape.

The Metallic Layer of the Fire Resistant Tape

The fire resistant tape 20 comprises the metallic layer 23 of the fire resistant tape. The metallic layer 23 can be an aluminum layer. Thus, the metallic layer 23 is preferably made of aluminum. Aluminum is beneficial for the seam tape for its low gas diffusivity, fire resistivity, and light weight.

The metallic layer 23 of the fire resistant tape can be an aluminum layer having a thickness in a range between 6 μm and 100 μm, preferably in a range between 30 μm and 50 μm. The thickness of said aluminum layer of the fire resistant tape may be at least 6 μm, preferably at least 15 μm, more preferably at least 25 μm, and most preferably at least 30 μm in order to improve the fire resistance and provide good water vapor barrier for the seams. Further, the thickness of the aluminum layer may be equal to or less than 100 μm, preferably equal to or less than 80 μm, more preferably equal to or less than 60 μm, and most preferably equal to or less than 50 μm in order to decrease costs. The metallic layer of the fire resistant tape can e.g. improve fire resistance of the fire resistant tape.

The metallic layer preferably comprises only one aluminum layer. Thus, it is possible to obtain substantially simple structure for the fire resistant seam tape. The metallic layer may consist of the one aluminum layer. In an embodiment, the metallic layer comprises two aluminum layers, and there may be an attachment layer left in between two adjacent aluminum layers in order to form the metallic layer.

The metallic layer of the fire resistant tape can have the same or substantially same properties as the metallic layer of the fire resistant barrier material. This can improve controllability of properties of the building envelope comprising the tape and the barrier material.

Support Layer of the Fire Resistant Tape

The fire resistant tape 20 comprises the support layer 25, which can be a fire resistant support layer. The fire resistant support layer 25 can substantially improve fire resistance of the fire resistant tape. The support layer 25 can further improve internal strength of the fire resistant tape and e.g. support the metallic layer from external stress, particularly during an installation process of the building envelope.

The fire resistant support layer can comprise or consist of a glass fiber fabric. The benefits obtained from the glass fiber fabric can be realized the better, the less the support layer comprises other materials.

Glass fibers of the glass fiber fabric may be sized glass fibers. Thus, the glass fiber fabric is preferably a sized glass fiber fabric made by weaving sized glass fiber yarns. The sizing can allow fibers to go through the weaving process without breaks.

Advantageously, the glass fibers are sized before the weaving process by using polyvinyl alcohol. An amount of the polyvinyl alcohol may be in a range between 0.1-1 g/m², determined from total weight of the glass fiber fabric. As discussed, sizing can improve easiness of weaving of the fabric.

The support layer of the fire resistant tape can be made of glass fibers. Glass fibers of the fire resistant tape can be incombustible textile fibers; hence, the glass fiber fabric can substantially improve flame resistance of the fire resistant tape and, further, improve flame resistance through the sealed seams of the building envelope comprising the fire resistant tape 20 and the fire resistant barrier material 10.

Furthermore, the glass fibers are very strong fibers and, hence, the glass fiber fabric can provide good strength properties for the fire resistant tape for sealing seams of the barrier material sheets. Still further, thanks to the glass fiber fabric, dimensional stability of the fire resistant tape can be improved, which can improve quality of the seams of the building envelope.

The glass fiber fabric is preferably so called raw glass fiber fabric, i.e., unfinished glass fiber fabric. Thanks to the raw glass fiber fabric, it is possible to obtain improved strength properties for the seams of the building envelope. Glass fiber yarns of the raw glass fiber fabric may have been sized before the weaving process.

The support layer can substantially improve flame retardant properties of the fire resistant tape and the building envelope comprising the tape. Thus, the fire resistant support layer can substantially improve flame retardant properties of the building envelope comprising the fire resistant tape.

The glass fiber fabric of the fire resistant tape can be incombustible, or at least substantially incombustible, i.e., it may not support flame. Furthermore, it may not emit toxic substances or smoke even upon exposure to heat, which can be particularly useful property in buildings. Still further, the glass fiber fabric may not be easily affected by rodents or insects, which can improve quality of the seams over a time.

The glass fiber fabric can be in a form of a layer having a predetermined specific mass.

The support layer of the fire resistant tape can have specific mass in a range between 50 g/m² and 500 g/m², preferably in a range between 60 g/m² and 300 g/m² more preferably in a range between 65 g/m² and 150 g/m², and most preferably in a range between 70 g/m² and 90 g/m². Thus, the support layer of the fire resistant tape can be able to improve fire resistance while supporting the metallic layer. Further, the smaller the specific mass is, the smaller can be the production costs. The aforementioned specific mass of the support layer of the fire resistant tape can provide good mechanical support, reliable seal, and resistivity to fire.

In an embodiment, the support layer 25 of the fire resistant tape comprises or consists of a glass fiber scrim having a specific mass in a range between 5 g/m² and 50 g/m², preferably in a range between 10 g/m² and 40 g/m². The glass fiber scrim can be a cost efficient alternative for the support layer. However, the glass fiber fabric can provide better properties than the glass fiber scrim.

The support layer of the fire resistant tape can have the same or substantially same properties as the support layer of the fire resistant barrier material. This can improve controllability of properties of the building envelope comprising the tape and the barrier material.

Glue Layer of the Fire Resistant Tape

The fire resistant tape 20 further comprises a glue layer 24 of the fire resistant tape between the metallic layer 23 and the support layer 25 to attach the metallic layer 23 to the support layer 25.

The glue layer of the fire resistant tape may comprise a bicomponent or multicomponent glue. The glue layer of the fire resistant tape can be a flame retardant glue layer. Preferably, the glue layer of the fire resistant tape is a flame retardant bicomponent or multicomponent glue.

The glue layer of the fire resistant tape can have a specific mass in a range between 0.1 g/m² and 15 g/m², preferably in a range between 0.5 g/m² and 3 g/m². The glue layer of the fire resistant tape may have a specific mass of at least 0.1 g/m², preferably equal to or more than 0.3 g/m², more preferably equal to or more than 0.5 g/m², and most preferably equal to or more than 0.8 g/m² in order to attach the metallic layer to the support layer in a reliable manner. Thus, the glue layer can provide good adhesion for layers to be attached to each other. Further, the glue layer may have a specific mass of equal to or less than 15 g/m$^2$, preferably equal to or less than 10 g/m$^2$, more preferably equal to or less than 6 g/m$^2$, and most preferably equal to or less than 3 g/m$^2$. Thus, the glue layer can be manufactured cost efficiently.

As discussed, the glue layer 24 of the fire resistant tape is preferably the flame retardant biocomponent or multicomponent glue layer.

The glue layer may comprise, or be made of, a flame retardant water based bicomponent or multicomponent glue. Preferably, the glue layer of the fire resistant tape comprises bicomponent or multicomponent polyurethane glue.

Preferably, the glue layer comprises bicomponent or multicomponent polyurethane glue formed by a reaction of isocyanates with polyols. Thanks to the bicomponent or multicomponent glue, tough and flexible bonds can be formed between the glass fiber fabric and the metallic layer. Furthermore, the bicomponent or multicomponent polyurethane glue can be particularly strong glue which can be resistant to degradation. Furthermore, the bicomponent or multicomponent polyurethane glue can work well with both surfaces: the glass fiber fabric and the metallic layer. Moreover, thanks to the isocyanate component, the adhesive properties of the glue can be improved.

As discussed, the glue layer of the fire resistant tape can comprise one or more than one flame retardant component. Thus, one or more flame retardant components may be added into the glue layer. In an embodiment, the flame retardant components of the glue layer comprise or consist of at least one of:
- nitrogen based component(s), particularly melamine, such as melamine polyphosphate, or melamine cyanurate,
- phosphor based component(s), particularly ammonium polyphosphate (APP), and
- inorganic based component(s), particularly alumina trihydrate (ATH) and/or magnesium hydroxide (MDH).

These chemicals can provide strongly improved fire resistance and flame extinguish properties for the glue layer of the fire resistant tape.

Technical effect of the nitrogen based component(s) is releasing inert nitrogen N2 for diluting fire gases, acting as cooling agents by endothermic decomposition, and also working as blowing agents in intumescent systems.

Technical effect of phosphor based component(s) is that, due to the carbon-rich environment, the gas-phase mechanism by forming phosphorus radicals is favored. Further, another flame retardant mechanism of ammonium polyphosphate is a formation of a char layer, which is a thick layer of carbon.

Technical effect of inorganic based component(s) is that they can reduce the burning rate, e.g., by releasing water to decrease the temperature (endothermic reaction) since decomposition occurs at higher temperatures. Further, minerals, such as aluminum, can also contribute to glassy char formation.

Thanks to the glue layer, particularly if the flame retardant bicomponent or multicomponent glue is used, many advantages can be obtained in addition to the improved fire resistance. For example, some barrier properties of the building envelope comprising the fire resistant tape and the fire resistant barrier material can be improved.

The glue layer of the fire resistant tape can have the same or substantially same properties as the glue layer of the fire resistant barrier material. This can improve controllability of properties of the building envelope comprising the tape and the barrier material.

Adhesive Coating Layer of the Fire Resistant Tape

The fire resistant tape comprises a pressure sensitive adhesive coating layer 28. The pressure sensitive adhesive coating may also be called a self-adhesive coating.

The pressure sensitive adhesive coating layer 28 is preferably an acrylic pressure sensitive adhesive coating layer. Acrylic adhesives can be environmentally friendly adhesives. Further, acrylic adhesives can have particularly suitable for the building envelope. Most preferably, the pressure sensitive adhesive coating layer 28 comprises water based acrylic pressure sensitive adhesive coating.

IAC Gold-certification can be given to products fulfilling low product emissions requirements. The fire resistant tape according to this specification can have low emissions according to Eurofins Indoor Air Comfort GOLD (IAC Gold) VOC requirements.

The fire resistant tape can be a permanent tape using a permanent acrylic pressure sensitive adhesive, which may not be easily removable from the fire resistant barrier material after the installation.

The acrylic pressure sensitive adhesive may be e.g. a tackified acrylic adhesive to provide aggressive adhesion with the outer surface of the fire resistant barrier material.

The acrylic pressure sensitive adhesive coating layer 28 is preferably a flame retardant acrylic pressure sensitive adhesive coating layer. Thanks to the flame retardant acrylic pressure sensitive adhesive coating layer, it is possible to form a firm seal for a seam of fire resistant barrier material sheets in order to improve flame retardant properties as well as some barrier properties of the building envelope.

Therefore, the adhesive coating can comprise flame retardant components in order to obtain flame retardant adhesive coating.

The at least one flame retardant component of the acrylic pressure sensitive adhesive coating layer 28 may be selected from a group comprising of consisting of:
- nitrogen based component(s), particularly melamine, such as melamine polyphosphate, or melamine cyanurate,
- phosphor based component(s), particularly ammonium polyphosphate (APP),
- inorganic based component(s), particularly alumina trihydrate (ATH) and/or magnesium hydroxide (MDH).

These chemicals can provide strongly improved fire resistance and flame extinguish properties for the adhesive layer.

Technical effect of the nitrogen based component(s) is releasing inert nitrogen N2 for diluting fire gases, acting as cooling agents by endothermic decomposition, and also working as blowing agents in intumescent systems.

Technical effect of phosphor based component(s) is that, due to the carbon-rich environment, the gas-phase mechanism by forming phosphorus radicals is favored. Further, another flame retardant mechanism of ammonium polyphosphate is a formation of a char layer, which is a thick layer of carbon.

Technical effect of inorganic based component(s) is that they can reduce the burning rate, e.g., by releasing water to decrease the temperature (endothermic reaction) since decomposition occurs at higher temperatures. Further, minerals, such as aluminum, can also contribute to glassy char formation.

The pressure sensitive adhesive coating layer can have a specific mass in a range between 20 g/m$^2$ and 200 g/m$^2$, preferably in a range between 30 g/m$^2$ and 80 g/m$^2$. The pressure sensitive adhesive coating layer may have a specific mass of at least 20 g/m², preferably equal to or more than 30 g/m², more preferably equal to or more than 35 g/m², and most preferably equal to or more than 40 g/m². Further, the pressure sensitive adhesive coating layer may have a specific mass of equal to or less than 200 g/m², preferably equal to or less than 150 g/m², more preferably equal to or less than 100 g/m², and most preferably equal to or less than 80 g/m². Thus, the pressure sensitive adhesive coating layer can provide good adhesion for tape to be attached to the fire resistant barrier material. Thus, a reliable seal can be formed for a seam of fire resistant barrier material sheets. Further, the pressure sensitive adhesive coating layer having a such specific mass can be manufactured cost efficiently.

The fire resistant tape 20 can be arranged to provide with the barrier material 10 a shear resistance of the joint of equal to or more than 150 N/50 mm, typically equal to or more than 300 N/50 mm, determined according to standard EN 12317-2.

Furthermore, thanks to the materials of the building envelope, peeling resistance of the tape on the substrate can be equal to or more than 6 N/50 mm, typically equal to or more than 12 N/50 mm, determined according to standard EN 12316-2 (after 24 hours).

The pressure sensitive adhesive coating layer is preferably a continuous adhesive layer in order to improve controllability of barrier properties of the building envelope.

The type and weight of the adhesive can be optimized to have very good adhesion to both: to the support layer of the tape as well as to the outer surface of the barrier material sheet. Thus, amount of adhesive can be minimized in order to obtain cost efficiently very good shear force and correct level of peel force, and also improving fire resistance performance.

In an embodiment, the pressure sensitive adhesive is a water based adhesive for low VOC emissions purposes. Alternatively, the pressure sensitive adhesive may be a hotmelt adhesive, preferably UV based hotmelt adhesive. Alternative, the pressure sensitive adhesive may be a solvent based adhesive. However, it may be challenging to obtain low VOC emissions with solvent based adhesives.

Lacquer Layer of the Fire Resistant Tape

The fire resistant tape may further comprise a lacquer layer 26 on the metallic layer. The lacquer layer can improve visual appearance of the fire resistant tape. The lacquer layer can further protect the metallic layer. Particularly, the lacquer layer 26, if used, can prevent a surface of e.g. aluminum from being easily oxidized. Thus, preferably, the lacquer layer, if used, is applied directly on the aluminum layer. Further, the lacquer can be used as a printing enhancer.

The lacquer layer may have a specific mass, e.g., in a range between 0.5 g/m² and 2 g/m².

Printing Layer of the Fire Resistant Tape

The fire resistant tape may be printed or unprinted. The printing 27 is not necessarily needed for the fire resistant tape, but it is merely an optional layer of the fire resistant tape e.g. for providing information.

The outer surface of the fire resistant tape may comprise e.g. printing 27 and/or the lacquer layer 26. Thus, the metallic layer 23 of the fire resistant tape 20 may be at least partly covered by the lacquer layer 26 and/or printing 27.

Release Liner of the Fire Resistant Tape

The fire resistant tape, while stored and transported, may have a release liner (not shown in Figures) on the adhesive coating layer 28. Thus, the pressure sensitive adhesive coating layer 28 may be left in between the support layer 25 and the release liner. The release liner can protect the pressure sensitive adhesive coating layer 28. The release liner can further improve self-woundability of the fire resistant tape.

The release liner may have a grammage in a range between 10 gsm and 200 gsm, preferably in a range between 50 gsm and 150 gsm. The release liner may be, for example, a paper based release liner or a plastic based release liner, or any other kind of workable release liner.

Thus, the release liner may comprise a base layer, which may be a paper or e.g. a polymer film. The release liner may further comprise a release coating layer on at least one side of the base layer. The release coating may be a silicone-based release coating. Thus, the release liner may be easily removed during an installation process in which the fire resistant tape is adhered to the first surface 11 of the fire resistant barrier material 10. During the installation process, the release liner may be removed from the fire resistant tape and the tape may be attached to the fire resistant barrier material in order to seal a seam between two fire resistant barrier material sheets.

Building Envelope

Figure 3A:
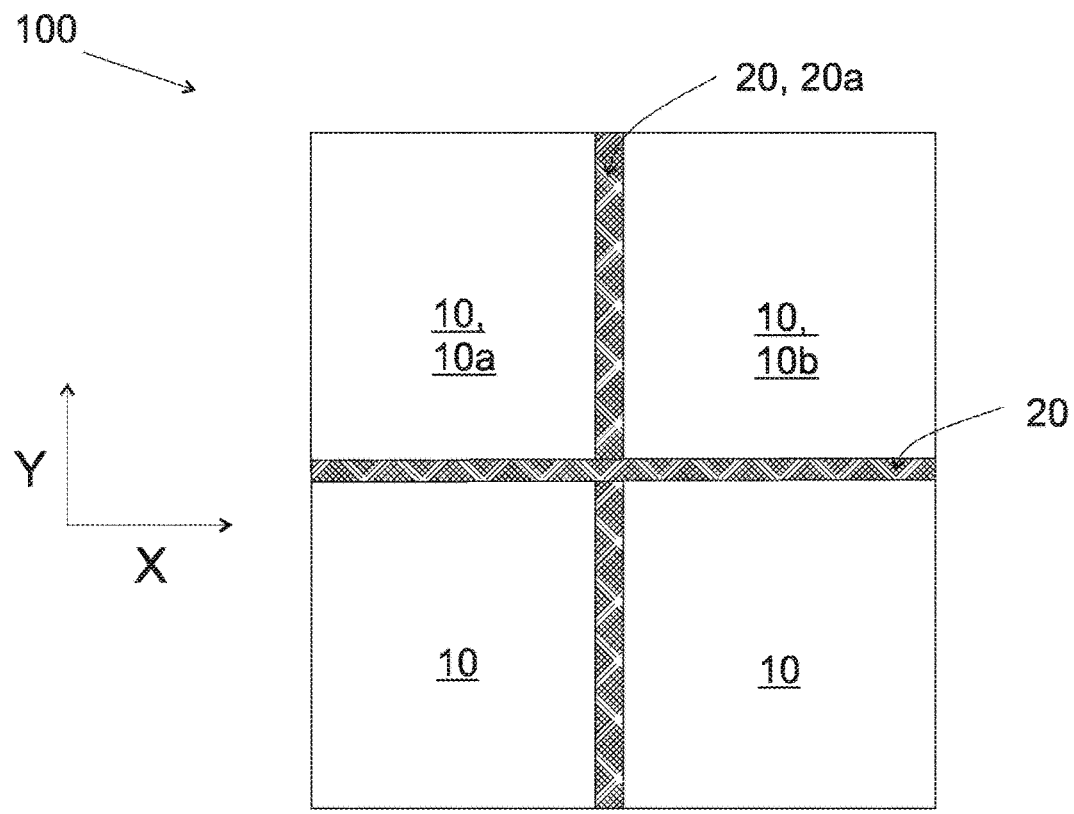
FIG. 3a illustrates an example structure of a building envelope comprising a fire resistant barrier material and a fire resistant tape.
Figure 3B:
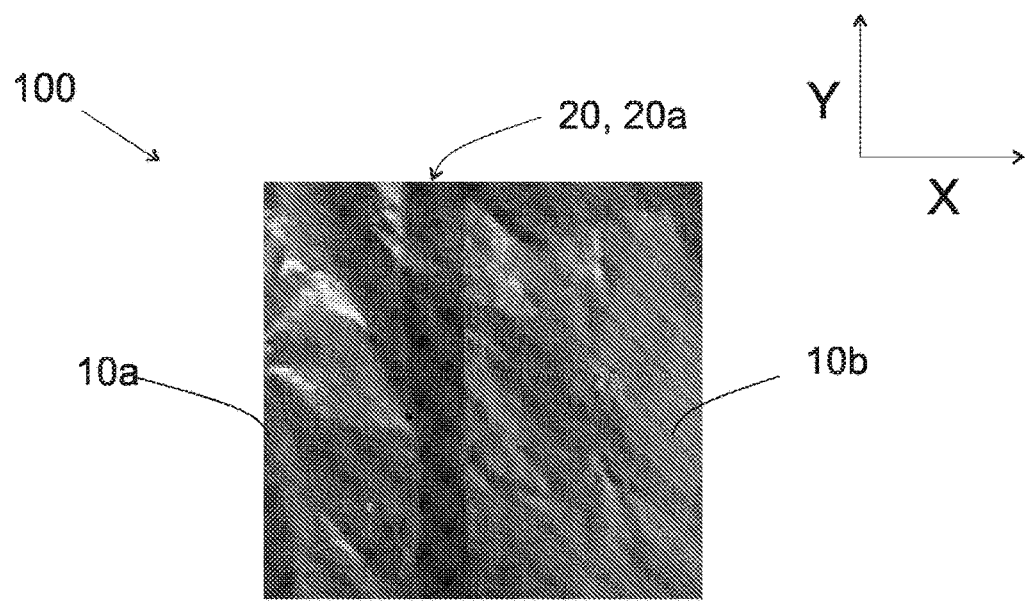
FIG. 3b shows a photo illustrating a part of a building envelope comprising a fire resistant barrier material and a fire resistant tape.

Referring to FIGS. 3a-b, the building envelope 100 comprises the fire resistant barrier material 10, 10a, 10b and the fire resistant tape 20. The fire resistant tape can be a fire resistant seam tape that is used to seal a seam between two fire resistant barrier material sheets. Thanks to the building envelope, improved sealing properties can be obtained, which can provide improved fire resistance. Furthermore, some barrier properties of the building envelope, such as water vapor barrier properties, can also be improved.

The fire resistant tape 20, while stored and transported, may be in a form of a roll and have a release liner on the adhesive layer. Thus, during an installation process, the release liner can be removed from the fire resistant tape 20, after which the tape can be attached to the fire resistant barrier material 10 in order to seal a seam between two fire resistant barrier material sheets 10a, 10b.

The inner surface 22 of the fire resistant tape comprising the pressure sensitive adhesive coating layer can be attached to the outer surface 11 of the fire resistant barrier material 10. The inner surface 22 of the fire resistant tape can comprise an acrylic pressure sensitive adhesive coating layer in order to adhere well to the outer surface of the fire resistant barrier material.

The fire resistant tape can be placed so that it can seal a seam of adjacent or overlapped fire resistant barrier material sheets. The installation process can be substantially easy and safe.

The sealed seam of the building envelope can be resistant to fire, water vapor, liquid, and air. The building envelope can be configured to protect a building from at least fire. Further, the building envelope can be configured to protect the building e.g. from humidity.

In order to obtain a reliable sealing 20a between the barrier material sheets 10a, 10b, the first fire resistant barrier material sheet 10a can overlap the second fire resistant barrier material sheet 10b at least 0 cm, preferably at least 3 cm, more preferably at least 5 cm and most preferably at least 8 cm in order to improve fire resistance, air sealing and water barrier properties. Further, the first fire resistant barrier material sheet 10a can overlap the second fire resistant barrier material sheet 10b less than 20 cm, preferably less than 15 cm, more preferably less than 12 cm and most preferably equal to or less than 10 cm. The fire resistant tape 20 can provide sufficient fire resistance, air sealing and water vapor barrier properties for the sealed seams. However, an easiness of the installing process can improve if the first sheet overlaps the second sheet. Thanks to the fire resistant tape 20, the first fire resistant barrier material sheets 10a may not need to overlap the second fire resistant barrier material sheet 20a. However, some overlapping of the sheets can improve easiness of the installation process.

A total amount of the fire resistant tape may be in a range between 2% and 15%, preferably in a range between 4% and 12%, and most preferably in a range between 5% and 10%, calculated from a total outer surface area of the building envelope. Thus, the fire resistant tape can be used to seal the seams of the fire resistant barrier material sheets. Thanks to said amount of the fire resistant tape, it is possible substantially improve flame retardant properties by sealing the fire resistant barrier material sheets with the fire resistant tape.

Further, seams of the building envelope can be sealed efficiently with the fire resistant tape 10. Thus, the installation method can be fast and easy method for installing the building envelope 100. This can reduce costs and increase effectiveness of the installation process.

Advantageously both, the fire resistant barrier material 10 as well as the fire resistant tape 20, comprise the metallic layer 13, 23 which is preferably an aluminum layer, the flame retardant glue layer 14, 24, which is preferably the flame retardant bicomponent or multicomponent glue, and the fire resistant support layer 15, 25. Thus, it is possible to highly improve some barrier and mechanical properties as well as the fire resistivity of the building envelope 100. Furthermore, controllability of at least some properties of the building envelope comprising the sealed seams 20a can be improved due to the similar structure of the fire resistant barrier material and the fire resistant tape 20.

The novel building envelope can ensure water, moisture and air tightness, and it can obtain improved emissivity, stiffness, mechanical strength, and dimensional stability.

Moreover, surprisingly, a building envelope comprising
the fire resistant barrier material sheets 10, 10a, 10b which fulfil the European fire protection standard Euroclass A2—s1, d0, wherein
seams between the sheets are sealed by using the fire resistant tape which fulfil the European fire protection standard Euroclass B—s2, d0,
can fulfil the European fire protection standard Euroclass A2—s1, d0, as long as the amount of the fire resistant seam tape 20 is equal to or less than 15%, determined from a total outer surface area of building envelope.

Water Vapor Barrier

The fire resistant barrier material is preferably a fire resistant watertight water vapor barrier material sheet.

The novel building envelope can be used as a water vapor barrier for high rise building and public building where fire safety is crucial. The water vapor barrier can further be used to prevent wind and air leaks that can create hot/cold zones in interior areas of buildings, and to prevent water and moisture infiltration.

In order to obtain barrier properties, the fire resistant barrier material preferably has a non-perforated structure.

An Example of a Manufacturing Method

The fire resistant barrier material may be a laminate that is formed by attaching the metallic layer to the fire resistant support layer by using the glue layer.

As an example, the fire resistant barrier material 10 may be manufactured by
providing a metallic layer 13,
optionally, lacquering the metallic layer,
providing a fire resistant support layer 15,
gluing the support layer 15 to the metallic layer 13, and
optionally, providing printing 17, preferably on the lacquered side.

The fire resistant barrier material can be produced in one step. The technical effect is to have a cost efficient solution minimizing the carbon foot print of the obtained product.

As an example, a method for manufacturing the fire resistant tape 20 may comprise the following steps:
providing a metallic layer 23,
optionally, lacquering the metallic layer,
providing a fire resistant support layer 25, and
gluing the support layer 25 to the metallic layer 23,
which above steps may be done in one pass, after which the method may further comprise the following steps:
a) coating a release liner by using a water based acrylic adhesive, and drying the water based acrylic adhesive in order to form the acrylic pressure sensitive adhesive coating layer 28, and attaching the support layer to the dried pressure sensitive adhesive coating layer 28, or
b) coating the support layer by using a water based acrylic adhesive, and drying the water based acrylic adhesive in order to form the acrylic pressure sensitive adhesive coating layer 28, and
attaching the release liner to the dried pressure sensitive adhesive coating layer 28,
and
slitting the formed material into narrower fire resistant tape rolls.

Further, application of printing, if used, may be done by using methods known by a skilled person.

Example 1

Fire resistant barrier material sheets as well as fire resistant seam tapes were manufactured.

The fire resistant support layer sheets and the fire resistant tape were tested according to European fire protection standard EN 13501-1:2007+A1:2009 (valid in 2021).

The fire resistant barrier material sheets were able to fulfil the European fire protection standard Euroclass A2—s1, d0.

Further, the fire resistant tape was able to fulfil the European fire protection standard Euroclass B—s2, d0.

Furthermore, the building envelope comprising the fire resistant barrier material sheets wherein seams between the sheets were sealed by using the fire resistant tape was tested according to European fire protection standard EN 13501-1:2007+A1:2009 (valid in 2021). Surprisingly, the whole building envelope comprising the fire resistant barrier material sheets of Euroclass A2—s1, d0 and the flame building envelope tape of Euroclass B—s2, d0 was able to fulfil the European fire protection standard Euroclass A2—s1, d0, when the amount of the fire resistant seam tape was equal to or less than 15%, determined from a total outer surface area of the building envelope.

Example 2

The building envelope as well as the fire resistant tape and the fire resistant barrier material sheets according to Example 1 were further tested for Sd and W1 watertightness.

According to the test results, Sd and W1 of the fire resistant barrier material sheets was always >1500 m and Sd and W1 of the fire resistant tape was always >1500 m. Furthermore, Sd and W1 values of the building envelope comprising the fire resistant barrier material sheets and the fire resistant tape up to 15% was >1500 m.

Thanks to the novel solution, many advantages can be obtained. For example, it is possible to obtain a building envelope having improved flame resistance and good mechanical properties. Thus, the building envelope can improve a fire resistivity of a building envelope. Further, the building envelope can have a good vapor barrier, strength levels, and handling properties.

The invention is not limited solely to the examples presented in Figures and the above description, but it may be modified within the scope of the appended claims.

The invention claimed is:

1. A building envelope (100) comprising a fire resistant tape (20) and a fire resistant barrier material (10), wherein the fire resistant tape (20) seals a seam between a first sheet (10a) of the fire resistant barrier material and a second sheet (10b) of the fire resistant barrier material,
wherein
A) the fire resistant barrier material (10) comprises
a metallic layer (13) of the fire resistant barrier material (10) which is an aluminum layer having a thickness in a range between 6 μm and 100 μm,
a support layer (15) of the fire resistant barrier material (10) comprising
a glass fiber fabric having a specific mass in a range between 50 g/m² and 500 g/m², or
a glass fiber scrim having a specific mass in a range between 5 g/m² and 50 g/m²,
and
a glue layer (14) of the fire resistant barrier material (10) between the metallic layer (13) and the support layer (15), the glue layer glue having a specific mass in a range between 0.5 g/m² and 15 g/m²,
and
B) the fire resistant tape comprises
a metallic layer (23) of the fire resistant tape (20), which is an aluminum layer having a thickness in a range between 6 μm and 100 μm,
a support layer (25) of the fire resistant tape (20) comprising
a glass fiber fabric having a specific mass in a range between 50 g/m² and 500 g/m², or
a glass fiber scrim having a specific mass in a range between 5 g/m² and 50 g/m²,
a glue layer (24) of the fire resistant tape (20) between the metallic layer (23) of the fire resistant tape and the support layer (25) of the fire resistant tape, the glue layer having a specific mass in a range between 0.5 g/m² and 15 g/m², and
an acrylic pressure sensitive adhesive coating layer (28) on the support layer (25) of the fire resistant tape, the acrylic pressure sensitive adhesive coating layer (28) having a specific mass in a range between 20 g/m² and 200 g/m².

2. The building envelope according to claim 1, wherein the building envelope is arranged to fulfill European fire protection standard Euroclass A2—s1, d0.

3. The building envelope according to claim 1, wherein the glue layers (14, 24) comprise a flame retardant bicomponent or multicomponent glue.

4. The building envelope according to claim 1, wherein the specific mass of the acrylic pressure sensitive adhesive coating layer (28) is in a range between 30 g/m² and 80 g/m².

5. The building envelope according to claim 1, wherein the acrylic pressure sensitive adhesive coating layer (28) is a flame retardant acrylic pressure sensitive adhesive coating layer comprising at least one flame retardant component.

6. The building envelope according to claim 1, wherein the specific mass of the glue layers (14, 24) is in a range between 0.7 g/m² and 3 g/m².

7. The building envelope according to claim 1 comprising the glass fiber fabrics, each glass fiber fabric having the specific mass in a range between 70 g/m² and 90 g/m².

8. The building envelope according to claim 1, wherein the thickness of the metallic layers (13, 23) is in a range between 30 μm and 50μ.

9. The building envelope according to claim 1, wherein the support layers (15, 25) comprise at least 90 wt. % glass fibers, determined from a total weight of each support layer.

10. The building envelope according to claim 1, wherein at least one of the support layers (15, 25) comprises sized glass fibers.

11. The building envelope according to claim 1, wherein a total amount of the fire resistant seam tape is equal to or less than 15%, determined from a total outer surface area of the building envelope.

12. A fire resistant seam tape for a building comprising
a metallic layer (23), which is an aluminum layer having a thickness in a range between 6 μm and 100 μm,
a support layer (25) comprising
a glass fiber fabric having a specific mass in a range between 50 g/m² and 500 g/m², or
a glass fiber scrim having a specific mass in a range between 5 g/m² and 50 g/m²,
a glue layer (24) between the metallic layer (23) and the support layer (25), the glue layer having a specific mass in a range between 0.5 g/m² and 15 g/m², and
an acrylic pressure sensitive adhesive coating layer (28) on the support layer (25), the acrylic pressure sensitive adhesive coating layer having a specific mass in a range between 20 g/m² and 200 g/m².

13. The fire resistant seam tape according to claim 12, wherein the tape is arranged to fulfil European fire protection standard Euroclass B—s2, d0.

14. The fire resistant seam tape according to claim 12, wherein the glue layer (24) comprises a flame retardant bicomponent or multicomponent glue.

15. The fire resistant seam tape according to claim 12, wherein the specific mass of the acrylic pressure sensitive adhesive coating layer (28) is in a range between 30 g/m² and 80 g/m².

16. The fire resistant seam tape of claim 12, wherein the acrylic pressure sensitive adhesive coating layer (28) is a flame retardant acrylic pressure sensitive adhesive coating layer comprising at least one flame retardant component.

17. The fire resistant seam tape of claim 12, wherein the specific mass of the glue layer (24) is in a range between 0.7 g/m² and 3 g/m².

18. The fire resistant seam tape according to claim 12 comprising the glass fiber fabric, the glass fiber fabric having the specific mass in a range between 70 g/m² and 90 g/m².

19. The fire resistant seam tape according to claim 12, wherein the thickness of the metallic layer (23) is in a range between 30 μm and 50 μm.

20. The fire resistant seam tape according to claim 12, wherein the support layer (25) comprises at least 90 wt. % glass fibers, determined from a total weight of each support layer.

* * * * *